Sept. 6, 1966
S. B. McCLOCKLIN
3,270,557
HYDRAULIC CIRCUIT TESTER
Filed March 26, 1964
2 Sheets-Sheet 1
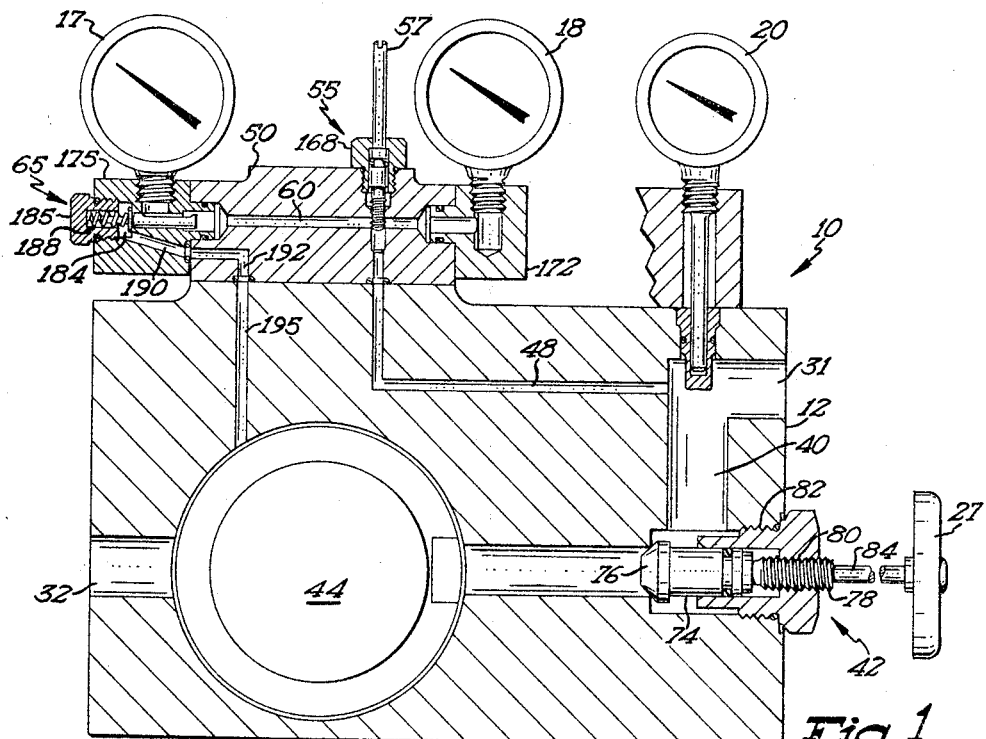
Fig 1
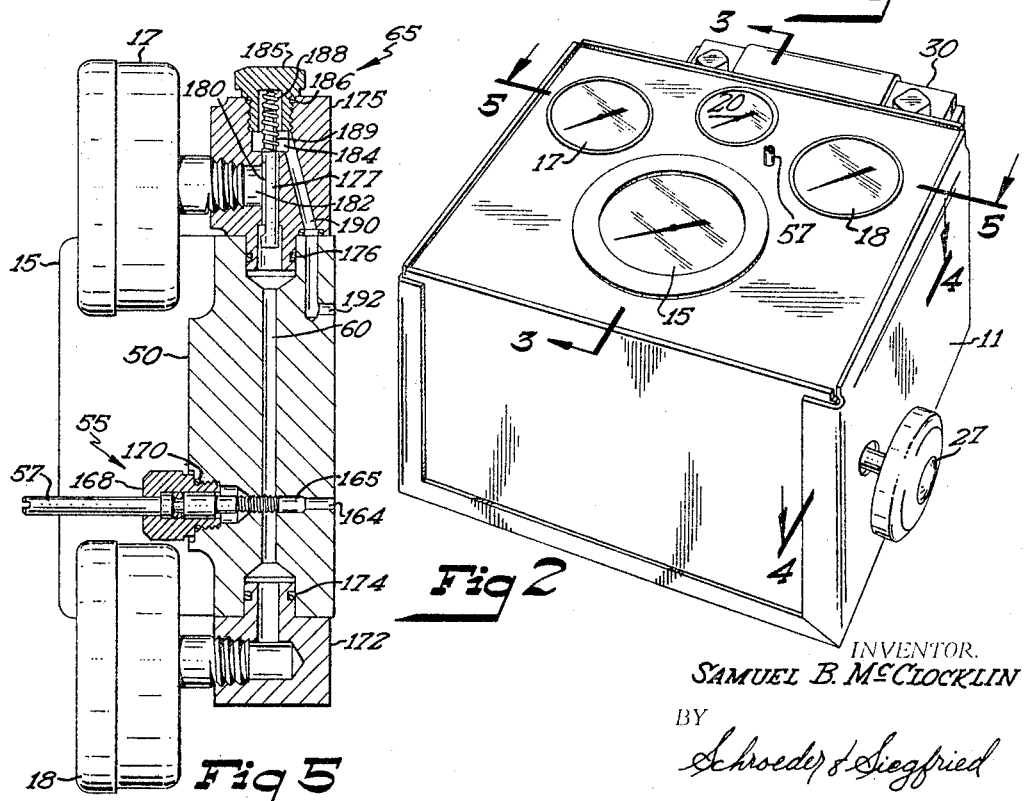
Fig 2
Fig 5
INVENTOR.
SAMUEL B. McCLOCKLIN
BY
Schroeder & Siegfried
ATTORNEYS Sept. 6, 1966

S. B. McCLOCKLIN 3,270,557

HYDRAULIC CIRCUIT TESTER

Filed March 26, 1964

INVENTOR.
SAMUEL B. McCLOCKLIN
BY
Schroeder & Siegfried
ATTORNEYS

United States Patent Office 3,270,557
Patented Sept. 6, 1966

3,270,557
HYDRAULIC CIRCUIT TESTER
Samuel B. McClocklin, Owatonna, Minn., assignor to The Owatonna Tool Company, Owatonna, Minn., a corporation of Minnesota
Filed Mar. 26, 1964, Ser. No. 355,049
11 Claims. (Cl. 73—168)

The subject invention relates to portable hydraulic circuit testers and more specifically to an improved hydraulic circuit tester useful in measuring temperature, pressure and flow in any point in a hydraulic system to which the tester can be connected.

While apparatus of this general type is known and in use, the improved hydraulic tester of the present invention is directed to an arrangement for measuring flow through the tester with a displacement type flow sensor and for selectively measuring pressures in high and low pressure ranges with protection to the gauges. The improved hydraulic circuit tester of the subject invention utilizes a positive flow type sensor which eliminates much of the maintenance problems with such equipment particularly with respect to special filtering arrangements utilized in prior circuit testers to provide for accuracy in flow measurement. The improved hydraulic tester includes a gauge for measurement of temperature at the inlet to the tester to accurately determine the temperature of the fluid being tested and includes in addition a pulsation damper to dampen pressure oscillations in the systems so that accurate pressure measurements may be made. This improved circuit requires no special filtering within the tester and thereby eliminates maintenance thereon while improving accuracy of the unit.

It is therefore an object of this invention to provide an improved hydraulic circuit tester.

Another object of this invention is to provide an improved hydraulic circuit tester which is portable and compact in design, may be readily installed into a hydraulic circuit and is adjustable to vary the loading on the tester and hence simulate characteristics in the hydraulic circuit being tested to provide accurate measurement of flow, temperature and pressure of the fluid in the circuit.

A still further object of this invention is to provide in a hydraulic circuit tester an improved measurement of pressures through the use of high and low pressure gauges with means for isolating the low pressure gauge under high pressure conditions to protect the same.

These and other objects of this invention will become apparent from a reading of the attached description together with the drawings wherein:

FIGURE 1 is a schematic diagram of the improved hydraulic tester;

FIGURE 2 is a perspective view of the improved hydraulic tester;

FIGURE 5 is a sectional view of a portion of the improved hydraulic tester taken along the lines 5—5 in the perspective view of FIGURE 2.

Figure 3:
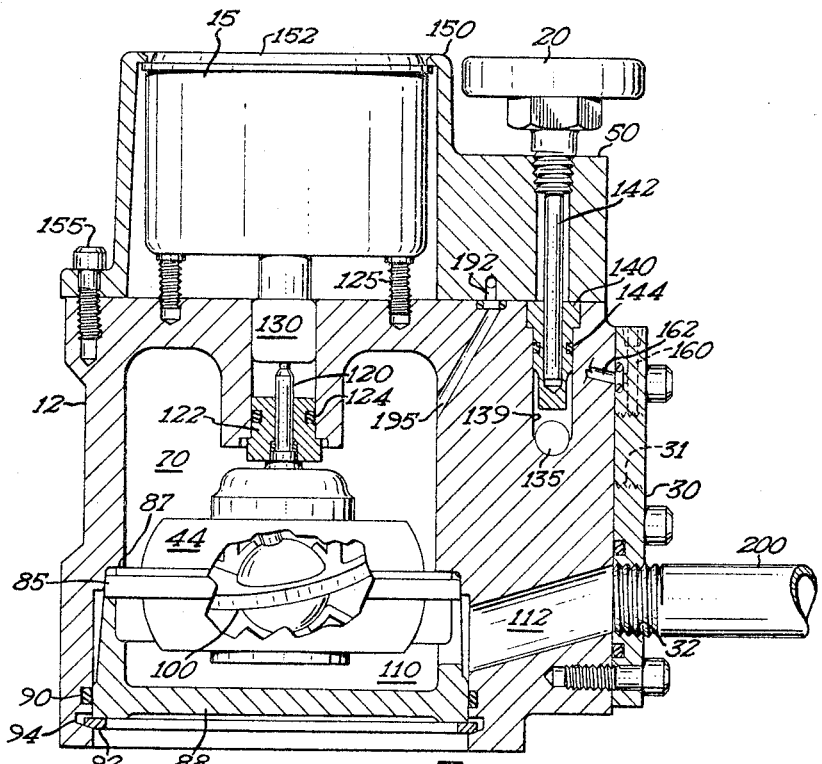
FIGURE 3 is a sectional view of the improved hydraulic tester taken along the lines 3—3 in the perspective view of FIGURE 2 with the cover removed.

The improved hydraulic tester is shown schematically in FIGURE 1 at 10 and in perspective in FIGURE 2 in which the body 12 of the tester is positioned within a casing or cover 11. Projecting through the cover on the top surface thereof is a flow meter 15 which is driven by a flow sensor positioned in the body 12 of the tester, as will be later identified, and high and low pressure meters 17 and 18, respectively. Also included in the cover of the tester is a temperature gauge 20 which, as will be later noted, measures the temperature of the fluid passing through the tester for test purposes. Attached to the back of the casing is a manifold, indicated generally at 30, having inlet and outlet ports therein, as will be later identified. Also projecting through the casing 11 is the handle 27 of a loading valve positioned in the body of the casing, as will be hereinafter identified.

Referring specifically to the schematic diagram of FIGURE 1, it will be seen that the body 12 of the tester includes an inlet port 31 and an outlet port 32 which are shown schematically in the diagram as on opposite sides of the body since all of the passages are in a common plane in the schematic diagram. However, in the actual body 12 of the hydraulic tester, these passages are aligned and join to the manifold 30 in a conventional manner. The inlet and outlet ports connect to a main flow passage 40 having the restrictor valve, shown generally at 42 therein with the passage continuing through the flow type sensor 44 to the outlet port 32 in the manifold.

Temperature gauge 20 has its well 140 positioned near the inlet port 31 in flow passage 40 of the body to sense the temperature to fluid at the inlet to the hydraulic tester. Also connected at the inlet side of the tester is a small secondary passage 48 which is of considerably smaller cross section that that of the main flow passage 40 through the hydraulic tester. This small secondary passages leads to the instrument manifold, indicated at 50, having an adjustable orifice or dampener 55 therein which has an adjusting key or tool receiving shaft 57 extending from the manifold 50 for adjustment purposes. Downstream of the dampener 55 is a second small passage 60 to which the high pressure gauge 18 is connected and suitably sealed. Passage 60 also leads to the low pressure gauge 17 which has a small gauge saver or three way pressure responsive valve, indicated generally at 65, associated therewith the purpose of which will be hereinafter identified. One passage from the valve leads to the low pressure gauge and the second passage from the pressure responsive valve leads through an additional small passage 190 through the meter block and body 11 to the main flow path common to the inlet side of the flow meter 44 and downstream of the loading valve 42.

Figure 4:
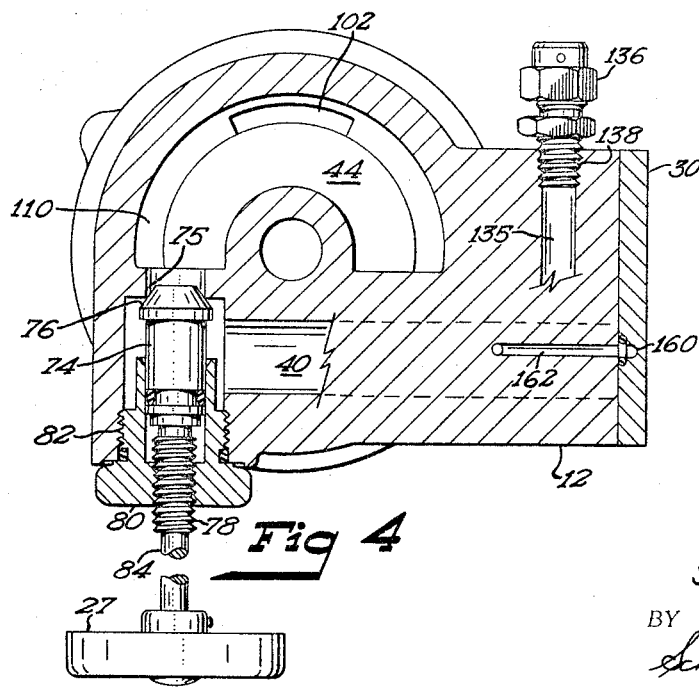
FIGURE 4 is a sectional view of the improved hydraulic tester taken along the lines 4—4 in the perspective view of FIGURE 2 with the cover removed.

The actual construction of the tester will best be seen in connection with FIGURES 3, 4, and 5 in which various sections are taken through the body 12 of the tester to show the relationship of parts therein. Thus, as will be seen in FIGURE 3, the manifold 30 has inlet ports 31, 32 with port 31 being shown in phantom therein. The body 12 of the tester which is shown in section along the lines 3—3 in FIGURE 2 discloses a main meter chamber 70 with the flow meter 44 therein. The flow passage 40 is actually inclined from the manifold 50 and inlet port 31 and will be seen in part in FIGURE 4 leading to the top of the meter chamber 70. Restrictor valve 42 or the loading valve, which is a balanced poppet valve, is shown in this passage, the valve incorporating a valve body 74 cooperating with a valve seat 75 in which the area or diametrical dimension of the seat is basically the same as the valve body dimension of the poppet valve to provide the balanced operation. Body 74 of the poppet valve is provided with a tapered valve closure portion 76 adapted to cooperate with the seat. The body 74 is carried on a screw type stem 78 threadedly mounted into a valve stem support 80 which in turn is threaded into a tapped aperture 82 in the tester body. The screw type stem has a projecting section 84 which mounts the handle 27 for operating the valve. The handle when rotated will advance the valve stem 78 and hence the valve body 74 with the valve closure portion 76 thereon toward and away from the valve seat 75 to control flow through the passage 40 from the inlet port 31 to the interior of the meter chamber 70.

The meter chamber 70 is divided by the body of the flow sensor 44, which is a positive displacement type meter of a nutating plate type. The edges of the body of the meter, as indicated at 85, rest against a shoulder 87 or recess in the measuring chamber 70 and the meter body is held in position by an insertion type support 88 which is sealed to the body 12 through a suitable sealing ring 90 and held in position within the body 12 by means of a clamping ring 92 which fits into a recess 94 in the lower surface of the body. The nutating plate type meter is a conventional component and only a portion of the same is disclosed for simplicity. Thus in FIGURE 3, the nutating plate is shown generally at 100 and the body of the measuring meter has an inlet aperture 102 on the upper surface thereof and a similar recess or outlet (not shown) leading to the lower portion 110 of the measuring chamber 70 defined by the meter mounting support 88 and common to the outlet passage 112 leading to the outlet port 32 in the manifold 30, as best seen in FIGURE 3. The positive displacement meter 44 includes a shaft 120 which is journalled in a suitable bearing or support member 122. Shaft 120 is sealed in the support member 122 and member 122 is sealed in body 12 through suitable sealing rings 124. The shaft 120 extends to a conventional tachometer or rotating type meter 15 which is secured to the body 12 through suitable screw means 125. Meter 15 is of the tachometer type and the output shaft 120 from the positive displacement meter couples through a splined coupling section 130 of the meter to provide the driving relationship therebetween. The positive displacement meter 44 has its nutating plate 100 oscillated with flow of fluid through the flow sensing portion of the meter to cause the shaft 120 to rotate continuously in one direction. The face of the meter or tachometer 15 is calibrated in gallons per minute to correlate the flow through the meter chamber 70 or the flow passage 40 with meter indication. The positive displacement meter insures that an accurate and continuous indication of flow through the flow passage 40 or between the inlet and outlet ports 31, 32 will be continuously indicated on the meter 15 and that such reading will not be affected by extraneous factors such as dirt in the fluid or the like.

The loading valve or restrictor valve 42 positioned in this flow passage may be adjusted to simulate load characteristics in the hydraulic circuit for test purposes. This restrictor valve is a balanced poppet needle type valve in which the area of the seat and the area of the valve closure member are the same. Thus, the only force on the poppet or valve closure member is the pressure in the passage 40 leading to the flow measuring chamber 70 which turns or operates the flow sensor and which in turn is connected directly to the outlet port. Therefore, the effort required to turn the valve handle 27 is very little even at high pressures. Pressure at the flow measuring or meter chamber 70 is increased by closing the poppet valve.

Also common to this inlet side of flow passage 40 is a secondary passage 135, shown in part in FIGURE 4 because of the inclination of the passage with respect to the section line through the valve body 12. This secondary passage terminates in a blow out or safety plug 136 which is threaded into a tapped aperture 138 in the valve body 12 and includes a replaceable blow out section (not shown) which is conventional. Passage 135, which extends generally horizontally through the body 12, has a vertical portion 139 in which the well 140 of the temperature sensing portion 142 of the thermometer or temperature gauge 20 is positioned. The well 140 is sealed in this passage through suitable sealing means 144.

The instrument manifold 50 which connects or mounts the high and low pressure gauges 17, 18 also has a flange portion, indicated at 150, with an aperture 152 therein which fits over and aligns with the face of the tachometer or flow meter 15 to secure the flow meter or aid in the positioning of the same on the valve body 12. This manifold is secured to the body through suitable screw means, such as indicated at 155. Further, the temperature gauge 20 is suitably connected through means, such as threading, into the manifold 50 to secure the temperature gauge 20 and hence the well 140 to the body 12 of the tester.

The manifold 30 at the inlet port includes a vertically extending passage, shown in phantom at 160, with a transversely extending port or passage 162 which extends into the body 12 of the tester and connects through a vertical passage 164 into the instrument manifold. These passages 160, 162, and 164 correspond with the small passage 48 shown schematically in the diagram of FIGURE 1. Passage 164 has the needle portion 165 of the adjustable orifice or pulsation dampener 55 included therein which needle portion terminates in the actuating stem 57 extending through the top of the meter block and is mounted in a retaining guide 168 threaded into the meter block 50 and sealed therein through a suitable sealing ring 170. Adjustment of the orifice will control the flow through the passages 160, 162, 164 from the inlet manifold port 31 to the passage 60 in the meter block 50 of the tester. Within the meter block 50 the transversely extending passage 60 leads to the high pressure gauge 18 which is mounted in a gauge well 172 and suitably connected to the meter block through means such as a bolt type fitting (not shown). A sealing ring 174 seals the passage at this point. Gauge 18 is shown schematically since it is conventional and may take varying forms. The transversely extending passage 60 in the meter block 50 also extends to the pressure responsive valve or gauge saver, shown generally at 65, and the low pressure gauge 17. In FIGURE 5 it will be seen that this pressure responsive valve is mounted in a connecting block or well 175 which is suitably connected to the meter block 50 through means, such as threading and is sealed by a sealing ring 176 therein. The pressure responsive valve 65 includes a valve closure member 177 with a recess or slot 180 therein and slidably mounted in the connecting block 175. A transversely extending port 182 in the connecting block 175 mounts the low pressure gauge 17 and provides the passage to the pressure responsive portion of the gauge from the valve in a conventional manner. Gauge 17 is also shown schematically since it is conventional and may take varying forms. Connecting block 175 includes in addition a recess 184 with a spring retaining cap 185 positioned therein which is connected to the connecting block 175 through suitable means, such as threading. A sealing ring 186 seals the spring retaining plug 185 in the meter connecting block 175. Further, a spring 188 encircling a shaft portion 189 of the valve closure member bears against the valve closure member and urges the same forward in the passage within the connecting block or well 175. The valve closure member 177 with the recess or slot 180 is designed to cooperate with the recess or cavity 184 to provide an outlet flow passage from the valve passage 182 through a port or passage 190 leading to a passage 192 in the meter block 50 and extending through a small passage 195 in the body, as will be seen in FIGURE 3, into the inlet side of the meter or measuring chamber 70 downstream of the flow restrictor valve 42. Thus under low pressure conditions, the force on the valve closure member will not be sufficient to displace the same against the force of the spring 189 to close the small flow passage around the end of the valve closure member and through the recess 180 into the passage 182 leading to the low pressure meter 17. Whenever a high pressure condition is experienced, flow caused thereby will displace the valve closure member 177 against the force of the spring 189 to close the passage 182 from the passage 60 in the meter block and open the passage 182 to the recess 184 permitting flow or venting of the pressure side of the low pressure member through the passage 190, 192 and 195 to the measuring chamber 70.

Further, it will be seen that the manifold 30 at the outlet port 32 includes a projecting coupling member 200 by means of which a return line of the flexible type may be connected to the hydraulic tester as an additional safety precaution to prevent injury to the tester due to the high pressure conditions. A flexible slip type covering and suitable clamp at this point insures blow out on the return side by slipping of the coupling in the event of extreme high pressure load conditions.

The operation of the improved hydraulic tester provides for connecting the inlet and outlet ports into a hydraulic circuit being tested. If desired, a diverting or splitting valve may be incorporated at this point. The hydraulic tester can simulate certain load conditions and measure pressures and temperatures of the fluid under test to isolate faults in hydraulic circuit. Flow through the inlet passage of the tester will drive the flow meter to measure the volume of flow through the tester. This flow meter includes a positive displacement type meter of the undulating plate type which drives a a tachometer calibrated in gallons per minute of flow through the inlet passage and beyond the restrictor valve 42 to cause the shaft of the displacement meter to rotate and each revolution displaces a constant volume of fluid. This type of meter eliminates the problems with dirt and contaminants in the fluid of the hydraulic circuit providing for increased accuracy in the measurements. Thus a direct reading of flow can be made in terms of gallons per minute with the improved hydraulic tester.

At the inlet of the tester, a thermometer records the temperature of the hydraulic fluid, and the bulb of the temperature gauge fits to the well 140 which is sealed in the body 12 of the tester to isolate the bulb from high pressure conditions. Flow through the measuring circuit or the small capacity passage in the body leads to the high and low pressure gauges to record the pressure of the hydraulic fluid under test. The inclusion of the low pressure gauge permits the tester to obtain accurate low pressure readings where high pressure gauges are difficult to read. The restrictor or pulsation dampener 55 is adjustable and permits substantially immediate pressure readings while dampening the pulsations in the hydraulic circuit which would cause the needles of the pressure gauges to fluctuate. The pulsation dampener is an adjustable orifice in which the threads thereon will control the restriction to dampen oscillations. This may be adjusted to a point where the flow is not restricted for instantaneous readings and may be adjusted to add restriction to the pressure sensing passage if fluctuation in the needles of the pressure gauges occurs. The hydraulic fluid passes through the threads of the orifice which controls the rate of flow to and from the gauges retarding back surge to the inlet side of the tester so that a steady state average pressure can be indicated.

The gauge saver or pressure responsive three way valve 65 is effective to isolate the low pressure gauge upon the presence of high pressure in the pressure sensing line or small diameter passage. The valve closure member 177 of valve 65 is positioned by the spring 188 in such a manner that the passage 182 to the low pressure gauge is connected to the small diameter passage 60 in the meter block 50. When pressure reaches a point where the force on the closure member 177 exceeds the force of the spring 188, the closure member shifts to close the connection between the low pressure gauge passage 182 and the meter passage 60 by movement of the recessed area 180 in the valve closure member 177. With this movement, the passage 182 is connected to the chamber 184 and the outlet or drain passages 190, 192 and 195 leading to the meter chamber or measuring chamber 70. The spring 188 allows the valve closure member to shift at a pressure slightly below the maximum capacity of the low pressure gauge 18. Thus, the low pressure gauge is protected against high pressure conditions in the tester and the pressure responsive portion of the same is vented around the restrictor valve 42 to the meter or measuring chamber 70 to release fluid therein.

This improved hydraulic tester eliminates much of the maintenance problems in equipment of this type particularly with respect to filtering arrangements to provide for increased accuracy in flow measuring with the tester. In addition, accuracy in reading is obtained by dampening the pressure in the meter passages to eliminate oscillations at the gauges for accurate reading. Further, the improved hydraulic tester provides for a wide range of pressure measurement through the use of high and low pressure gauges of which the low pressure gauge is protected against abnormally high pressure conditions by the pressure responsive valve. In addition, the improved tester includes provisions for abnormal pressures in the tester through the use of a blowout plug included therewith and a special outlet port permitting disconnection of the hydraulic system from the tester under severe or abnormal pressure conditions.

Therefore, in considering this invention it should be remembered that the present disclosure is intended to be illustrative only and the scope of the invention should be determined by the appended claims.

What is claimed is:

1. A portable hydraulic circuit tester comprising, a casing having a continuous passageway therethrough, a manifold mounted on said casing and having inlet and outlet ports therein connected to the ends of said continuous passageway in said casing, said ports being adapted to be connected to a hydraulic circuit to be tested whereby fluid under pressure developed in the circuit flows through the tester and back to the circuit, a chamber included within said casing as a part of said continuous passageway, a positive displacement meter positioned in said chamber including shaft means extending through said casing from said chamber and being caused to rotate with flow of a fluid through said chamber, an indicator mounted on said casing and connected to said shaft means to operate in accordance with the rotation of said shaft means and flow of the fluid through said chamber, load varying means positioned in said passageway upstream of said chamber, a second passageway included in said casing and connected to said inlet port, said second passageway having a substantially smaller fluid capacity relative to the capacity of said passageway of said continuous passageway, a high pressure gauge connected in said second passageway, an additional small capacity passageway connected to said high pressure gauge, a low pressure gauge connected to said additional low capacity passageway, pressure responsive valve means included in said additional passageway and adapted upon the presence of a high pressure in said second passageway to isolate the low pressure gauge from said second passageway, and a relief passage included in part in said pressure responsive valve and in part in said casing and adapted to connect the low pressure gauge to said chamber whenever a low pressure gauge is isolated from said second passageway.

2. The portable hydraulic circuit tester of claim 1 in which the load varying means is a balanced poppet valve positioned in the continuous passageway ahead of the chamber and adapted to adjust flow through the continuous passageway.

3. The portable hydraulic circuit tester of claim 2 and including a pulsation damper positioned in said second passageway intermediate the inlet port and the high pressure gauge.

4. The hydraulic circuit tester of claim 3 in which the pulsation damper is an adjustable orifice.

5. The hydraulic circuit tester of claim 4, and including a temperature gauge having a well with the temperature responsive means positioned in the well at the inlet port in said casing of said tester.

6. The hydraulic circuit tester of claim 2 in which the balanced poppet valve positioned in said continuous passageway ahead of said chamber includes a valve seat and a valve closure member having the same diametrical dimension and an actuating shaft with a handle extending out of said casing for manual adjustment of the valve closure member relative to the valve seat such that variation in loading can be obtained in said continuous passageway.

7. The portable hydraulic circuit tester of claim 4 in which the pressure responsive valve included in the additional passageway connected to the second passage is a pressure responsive three way valve which in one position of operation connects the low pressure gauge with the high pressure gauge and the second passageway and in a second position of operation isolates the low pressure gauge from the second passageway.

8. The portable hydraulic circuit tester of claim 2 in which the positive displacement meter positioned in said chamber is of the nutating plate type.

9. The portable hydraulic circuit tester of claim 8 in which the indicator is a tachometer calibrated in gallons per minute and is connected to and operated by the nutating type plate.

10. A portable hydraulic circuit tester comprising, a casing having a continuous passageway therethrough with inlet and outlet ports at the extremities thereof, a positive displacement flow sensor positioned in said passageway intermediate the inlet and outlet ports and including a shaft extending through said casing, an indicator mounted on said casing and connected to said shaft means to operate in accordance with the rotation of said shaft means and flow of the fluid through said passageway, valve means positioned in said passageway intermediate the inlet port and said positive displacement flow sensor to vary the flow through said passageway, a secondary passageway of smaller diametrical dimension than the dimension of the passageway connected to said inlet of the passageway, gauge means connected to the other end of said secondary passageway and responsive to pressure at the inlet to said secondary passageway, said gauge means including a high and a low pressure gauge, a three way valve for separating the high and low pressure gauges and adapted to be responsive to predetermined pressure to selectively connect and disconnect the low pressure gauge from the high pressure gauge, and an adjustable orifice means positioned in said secondary passageway intermediate said gauge means and the inlet of said secondary passageway to dampen pressure oscillations to said gauge means.

11. The hydraulic circuit tester of claim 10 and including additional passage means connected to said three way valve such that said valve may selectively connect the low pressure gauge to said secondary passageway upon the presence of a low pressure in said passageway and the isolation of a low pressure gauge from the high pressure gauge upon the presence of high pressure in said secondary passageway.

References Cited by the Examiner

UNITED STATES PATENTS 2,924,971 2/1960 Schroeder et al. _____ 73—168
2,960,074 11/1960 Zavada _____ 73—258 X DAVID SCHONBERG, Primary Examiner.

LOUIS R. PRINCE, Examiner.

M. B. HEPPS, Assistant Examiner.